No. 761,024. PATENTED MAY 24, 1904.
A. F. ALLAN & J. A. LENHOFF.
COUPLING FOR AIR BRAKE HOSE.
APPLICATION FILED NOV. 13, 1903.
NO MODEL. 2 SHEETS—SHEET 1.
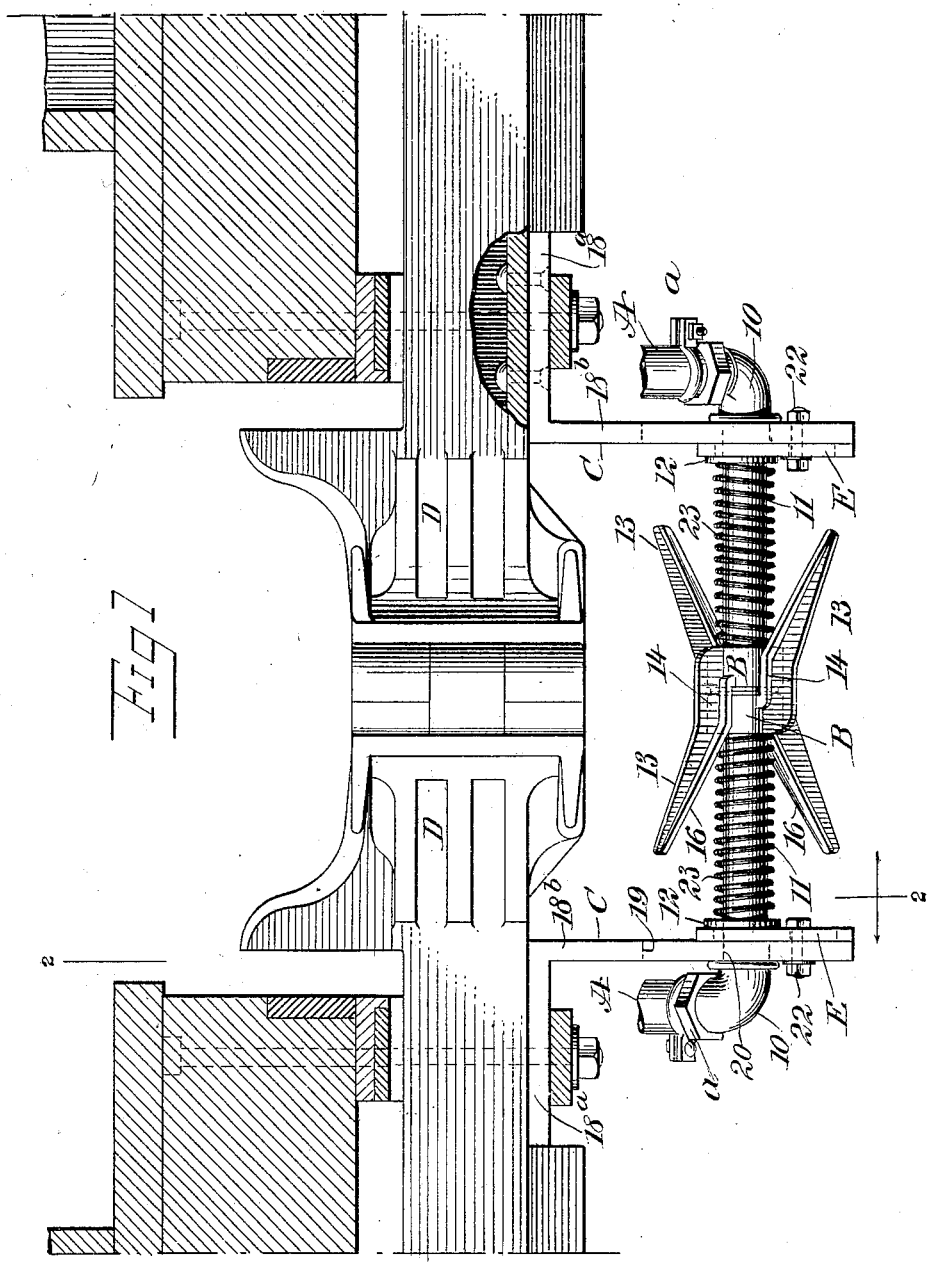
WITNESSES:
INVENTORS
Archibald F. Allan
John A. Lenhoff
BY
ATTORNEYS

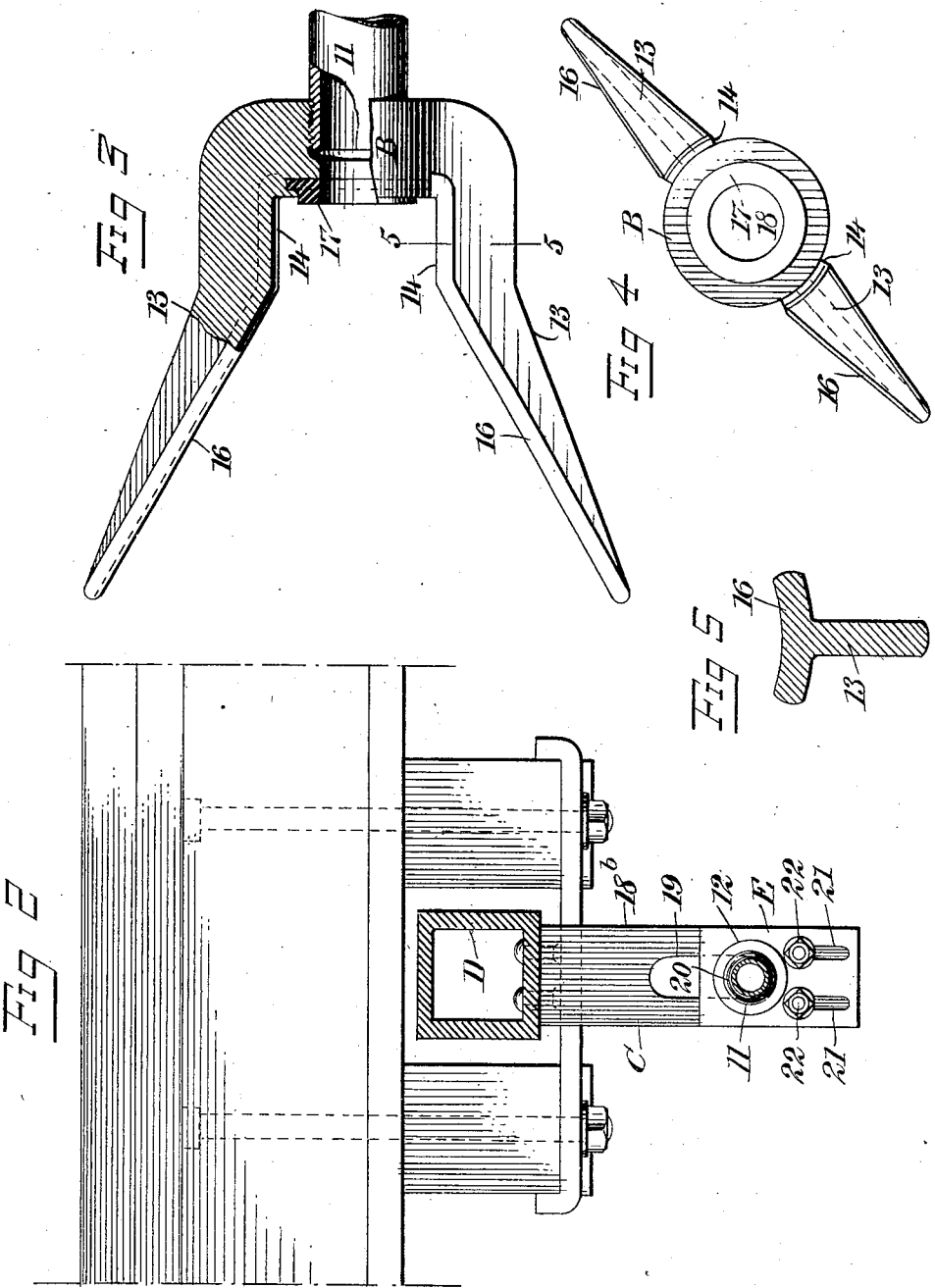

No. 761,024. Patented May 24, 1904.

UNITED STATES PATENT OFFICE.

ARCHIBALD F. ALLAN AND JOHN A. LENHOFF, OF WILMINGTON, DELAWARE.

COUPLING FOR AIR-BRAKE HOSE.

SPECIFICATION forming part of Letters Patent No. 761,024, dated May 24, 1904.

Application filed November 13, 1903. Serial No. 181,013. (No model.)

*To all whom it may concern:*

Be it known that we, ARCHIBALD F. ALLAN and JOHN A. LENHOFF, citizens of the United States, and residents of Wilmington, in the county of Newcastle and State of Delaware, have invented a new and Improved Coupling for Air-Brake Hose, of which the following is a full, clear, and exact description.

The purpose of our invention is to provide a coupling for air-brake hose which will act automatically in coupling and uncoupling and to improve upon the construction of a similar device for which application for patent was made by us on December 19, 1902, Serial No. 135,832, and allowed April 23, 1903, which improvements mainly consist in providing spring-supports for the locking-terminals of the hose connected with the air-brake, which spring-supports serve to hold said locking-terminals in substantially horizontal position at all times when uncoupled and assure the coupling of opposing locking-terminals, which locking-terminals when the coupling is effected are in end or longitudinal alinement, occupying either a horizontal position or an inclined position, according to whether the couplings of opposing cars are the same distance from the ground or one higher or lower than the other, in which position they are held while coupled by the interlocking engagement of coupling-heads at the outer end portions of the locking-terminals. Another improvement is to strengthen the construction of the coupling-heads and insure one head fitting accurately to the other when opposing heads are in coupling engagement.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a vertical section through the sills of opposing cars, a side elevation of the couplers for the cars, and a side elevation of the improved coupler for the air-brake hose in coupled position. Fig. 2 is a vertical section taken practically on the line 2 2 of Fig. 1. Fig. 3 is a sectional plan view of a coupling-head for the air-brake hose. Fig. 4 is a front elevation of the head shown in Fig. 3, and Fig. 5 is a transverse section taken substantially on the line 5 5 of Fig. 3.

A represents a line of rubber hose used in connection with the air-brake, which hose is carried by a stop-cock in the ordinary manner. Each terminal end of the hose A is connected by a clamp $a$ with a metal elbow 10, and this elbow is secured in any suitable or approved manner to a metal locking-terminal pipe 11 for the said hose, it being understood that the construction is duplicated at each end of the said hose A.

Where the terminal locking-pipe 11 connects with the elbow 10, an ordinary washer 12 is slipped over the terminal pipe to prevent the spring from catching in an opening in an adjusting-plate E, through which the terminal pipe passes, as will be hereinafter described. At the outer end of each terminal pipe 11 of the conducting-hose A a metal head is screwed or otherwise secured upon the said pipe 11. These heads are best illustrated in Figs. 1 and 3, and at opposite sides of each head B a guide-finger 13 is preferably integrally formed with the said head, as is shown in Fig. 3. These guide-fingers diverge, extending outward in opposite directions, and are more or less tapering, but their inner longitudinal edges 14 adjacent to the head are substantially at right angles to the head, as is also best shown in Fig. 3.

The guide-fingers 13 have an inclination of about thirty degrees, enabling opposing heads B to be brought to a locking position in a horizontal plane or at an inclination one to the other, as has been stated. Each finger 13 of each head B is provided with a concaved flange 16 at its inner edge, as is shown in Figs. 3 and 5, which flanges at the surfaces 14 of the fingers 13 engage with the exterior of the head portions of opposing coupling-heads when such heads are brought together, thus insuring a firm and perfect contact. At the outer central face of each coupling-head B an elastic washer 17 is fastened in any approved manner, and these washers surround the bores 18 in the head, into which bores the locking-terminal pipes 11 extend. When the heads B are in coupling engagement, the fingers of one head enter the spaces between the fingers of the opposing head, and by reason of opposing fingers riding one upon the other the flanges 16, above referred to, form wide bearing-surfaces for the fingers, and as the coupling-heads come together the elastic or cushion washers 17 are brought into close engagement, effecting an air-tight and a steam-tight connection between the opposing heads.

A hanger C is provided for each terminal section or terminal locking-pipe 11 of a conducting-hose A, and these hangers consist of upper horizontal members 18$^a$, attached to the under faces of couplings D for the cars, as is shown in Fig. 1, and vertical members 18$^b$, which extend downward from the car-couplings D, as is shown in Figs. 1 and 2. In the vertical members 18$^b$ of the hangers C longitudinal slots 19 are produced, one in each of said members. Each hanger C is adapted to carry an adjusting member E, having a terminal locking-pipe 11, as is shown in Figs. 1 and 2, and in a measure these adjusting members E serve as supports for the terminal locking-pipes 11. Each adjusting member E consists of a plate adapted for sliding movement at the outer face of the vertical member 18$^b$ of a hanger C and is provided with an aperture 20 at its upper end. The said aperture receives the washer 12, heretofore referred to, as is shown in Fig. 1. The object of the adjustability of the member E is to raise or lower the coupling to a standard height—as, for example, when the car becomes old and sags. In order that the adjusting members E may be held in vertically-adjusted position, slots 21 are made in the lower portions of the said members E, as is shown in Fig. 2, and bolts 22 are passed through these slots and into the vertical members 18$^b$ of the hangers C, carrying the adjusting members or plates.

Before the heads B are secured to the outer ends or the terminal locking-pipes 11 coil-springs 23, heretofore alluded to, are placed under tension and are slipped over the said terminal locking-pipes, bearing at one end against an adjusting member E or a washer 12, the opposite end of the spring bearing against a coupling-head B when the spring is in position on the terminal pipe 11. These springs 23, being thus placed under normal tension, serve to normally hold the terminal locking-pipes 11 in practically a horizontal position while the couplers are in uncoupled position.

In coupling opposing terminal locking-pipes are in end alinement, and when the cars are of the same height are horizontal, as shown; but when one car is higher than the other or lower than the other the coupled terminal locking-pipe will have more or less of an inclination, but will yet be in end alinement.

In coupling the springs 23 are placed under tension, so that as soon as cars provided with the improved air-brake-hose couplings are separated the guide-fingers of the heads B will quickly leave one another and will be automatically brought to an unlocked position by the action of the springs 23 in their endeavor to straighten themselves or to relieve themselves from tension.

Having thus described our invention, we claim as new and desire to secure by Letters Patent—

1. In couplings for air-brake hose, hangers, plates adjustable on the hangers, an air-brake hose extending through the hangers and the adjusting-plates, coupling-heads for the terminals of the hose, and springs between the heads and adjusting-plates, arranged to normally hold the said terminal portions of the air-brake hose in substantially a horizontal position, as described.

2. In couplings for air-brake hose, a car-coupler, a hanger attached to the coupler, a plate adjustable on the hanger, means for locking the plate in adjusted position, a section of air-brake hose adjustable in the hanger and extending through the adjusting-plate, a coupling-head for the terminal portion of the air-brake hose, and a spring normally under tension and encircling the terminal section of the air-brake hose, the said spring bearing at one end against the coupling-head and extending from the said head to the adjusting-plate, and normally holding the coupling-head in a horizontal position, as set forth.

3. In couplings for air-brake hose, a coupling-head provided with oppositely-located guide-fingers inclined in opposite directions from a point near the head to their outer ends, being substantially straight between their inclined portions and the head, as described, the inner faces of the said guide-fingers being provided with flanges concaved at their opposing faces, which flanges project from opposite sides of the fingers and extend along the opposing faces of the fingers from the head to the free ends of said fingers, the said flanges at the straight portions of the fingers being adapted to engage with the exterior of the head portions of opposing coupling-heads when such heads are brought together as described.

4. In a coupling for air-brake hose, a coupling-head provided with oppositely-located guide-fingers inclined in opposite directions from a point near the head to their outer ends, being substantially straight between their inclined portions and the head, each guide-finger being provided with a concaved flange at its inner edge projecting from opposite sides of the finger, the flanges extending along the opposing faces of the fingers from the head to the free ends of said fingers, the said concaved flanges at the straight portions of the fingers being adapted to engage with the exterior of the head portions of opposing coupling-heads when such heads are brought together, the said fingers and their flanges being correspondingly beveled at opposite sides, their free ends being narrower in a transverse direction than the ends connected with the head, as specified.

5. In couplings for air-brake hose, a hanger, a plate adjustable on the hanger, an air-brake hose, a rigid tubular terminal for the said hose, having sliding movement in the hanger and supporting movement in the adjusting-plate, a coupling-head for the said terminal section of the said air-brake hose, and a spring normally under tension and coiled around the said terminal section of the air-brake hose, which spring extends substantially from the adjusting-plate to the opposing face of the coupling-head, the tension of the spring supporting the weight of the coupling-head, and keeping said head normally in a horizontal position when not coupled.

6. In couplings for air-brake hose, a hanger having a vertical member provided with a slot, an adjusting-plate having vertical movement on the outer face of the vertical member of the hanger and provided with an opening registering with the slot in the hanger, means for locking the adjusting-plate in adjusted position, a section of air-brake hose extending through the slot in the hanger and the opening in the adjusting-plate, a coupling-head for the terminal portion of the air-brake hose, a washer for the terminal portion of the hose and engaging the adjusting-plate, and a spring encircling the terminal section of the hose and bearing at one end against the coupling-head and at the other end against the washer, the tension of said spring normally holding the terminal section of the hose in substantially a horizontal position, as set forth.

In testimony whereof we have signed our names to this specification in the presence of two subscribing witnesses.

ARCHIBALD F. ALLAN.
JOHN A. LENHOFF.

Witnesses:
   JAMES I. WALSH,
   J. RALPH WOODMANSEY.